United States Patent Office 3,698,996
Patented Oct. 17, 1972

3,698,996
METHOD OF DETECTING THE PRESENCE OF A DEFECTIVE LITHIUM-ALUMINATE TARGET IN A REACTOR
Raymond Cooperstein, 2529 Harris Ave., Richland, Wash. 99352
No Drawing. Filed Nov. 24, 1970, Ser. No. 87,369
Int. Cl. G21c 17/00
U.S. Cl. 176—19 LD        4 Claims

ABSTRACT OF THE DISCLOSURE

The addition of a rare earth isotope which, upon neutron radiation emits gamma rays to lithium-aluminate target elements, will permit defective elements to be detected in reactors by monitoring the effluent for gamma radiation.

CONTRACTUAL ORIGIN OF THE INVENTION

The invention described herein was made in the course of, or under, a contract with the United States Atomic Energy Commission.

BACKGROUND OF THE INVENTION

This invention relates to a method for detecting the presence of failed lithium-aluminate targets in a liquid-cooled nuclear reactor.

Tritium is an isotope of hydrogen having a mass number of 3. One method of producing tritium is by bombarding an isotope of lithium having a mass of 6 with neutrons which form tritium and helium. Some of the tritium so formed decays and reacts with another neutron to form tritium plus hydrogen having a mass number of 1, often called protium.

Natural lithium contains about 7% of the $Li^6$ isotope and, as used for the production of tritium, is generally in the form of a metal such as aluminum-lithium alloy or, more recently, in the form of a ceramic such as lithium aluminate. These compounds are made into cores clad in metal to form targets and irradiated in a neutronic reactor to produce the tritium. After irradiation, the targets are removed from the reactor, the cladding is stripped from the metal or ceramic cores and the cores processed by various methods to extract the tritium.

In the N-Production Reactor, located at Hanford, Wash., lithium aluminate is formed into a cylindrical shape and clad with an inner unbonded layer of aluminum and an outer unbonded layer of Zircaloy-2 to make up a target element. The cylindrical target fits inside a tubular-shaped fuel element made up of a uranium compound, called a driver core. The target is spaced from the inner wall of the driver core to form an annular space for coolant flow. A number of these driver-target assemblies fit into each process tube in the reactor and are cooled by a flow of water therethrough.

A portion of the cooling water flowing through each process tube in the reactor is diverted and monitored for both gross gamma radiation and for gamma energy, the monitors being set to alarm the reactor operators should certain limits be exceeded. Monitoring is necessary because gamma radiation present in the effluent may be due to a cladding failure in one of the driver elements. It is important that any cladding failure be detected immediately so that the defective driver element can be removed from the reactor promptly to prevent release of additional radiation into the effluent and atmosphere and to prevent possible damage to the process tubes.

Detection of defective target elements is also important to prevent release of tritium and target material to the coolant. A defective target could ultimately result in driver failure and would be detrimental to reactor operation from the standpoints of thermal, hydraulic and reactivity effects. In addition, the presence of a defective target among a batch of targets being procesesd to extract the tritium therein could lead to a drastic reduction of the isotopic purity ratio level, i.e., percent tritium in the hydrogenous extract. Here, too low a tritium level could result in scrapping the entire batch because of difficulty in separating tritium from hydrogen at low tritium levels.

Since irradiated target elements emit no gamma radiation, a defective target is not detectable by the gamma-radiation-monitoring system in the reactor process tubes. Only by analysis of the reactor coolant for tritium content can target element failures be monitored. However, the minimum time required for an analytical result is 24 hours.

I have developed a method by which defective targets can be promptly detected and located by the gamma radiation system presently installed in the reactor coolant system.

SUMMARY OF THE INVENTION

By the method of my invention, an internal indicator is incorporated into the lithium aluminate during fabrication which will, upon activation by neutrons in the reactor, emit gamma radiation in the reactor effluent should a target element be breached, so that the defective target can be readily detected and located by the existing gamma-radiation-monitoring system.

It is therefore an object of my invention to provide a method for detecting defective lithium-aluminate target elements in reactors.

It is another object of this invention to provide a method for detecting defective lithium-aluminate target elements that is fast and effective.

It is still another object of this invention to provide a method for detecting defective lithium-aluminate target elements in reactors using the existing montioring system.

Finally, it is an object of this invention to provide a method for detecting lithium-aluminate target elements which is compatible with existing target element fabrication methods and with existing tritium extraction methods.

DESCRIPTION OF THE PREFERRED EMBODIMENT

These and other objects of the invention can be met by adding to the lithium aluminate in the target 0.01 to 2.0 weight percent (w/o) of a rare earth isotope indicator, the isotope being one which is activatable by neutron radiation to emit gamma radiation, monitoring the reactor coolant for gamma radiation and relating the presence of gamma radiation in the coolant to the failure of a lithium-aluminate target.

In theory, most gamma-emitting elements can be used as an indicator. In practice, the choice of the proper indicator is critical in order that the fabrication, radiation and processing characteristics of the lithium-aluminate target elements be not affected and yet ensure that the positive detection of defective elements is possible. For example, the indicator must not reduce the density of the ceramic core, nor can it affect the neutron absorption characteristics. The amount of radioactivity which the indicator adds to the target element must be little enough to be compatible with existing procedures and equipment for handling, shipping, storage and extraction of the irradiated target elements and yet emit sufficient gamma radiation to alarm the monitoring system presently installed. The threshold setting of the gamma detectors and their window widths, the half-lives and radiation intensities of the indicator also affect compatibility with the monitoring system. Also, the element must not be one which is already present in the primary coolant, since the addition of a radioactive indicator might not be as readily detectable as would be desirable.

The rare earth isotopes which meet the above-discussed criteria include, but are not necessarily limited to, cerium$^{140}$, cerium$^{142}$, praseodymium$^{141}$, samarium$^{152}$, gadolinium$^{158}$, dysprosium$^{164}$ and lutetium$^{175}$. It will be noted that, by employing isotopes which are activatable by neutron radiation to emit gamma radiation, fabrication of the lithium-aluminate target elements is greatly simplified, since the special precautions necessary when working with gamma-radiation-emitting materials are not necessary.

The amount of rare earth isotope indicator to be added to the lithium aluminate as their oxides may vary in elemental concentrations between 0.01 and 2.0 w/o. An optimum range would be between 0.3 and 0.8 w/o based on experience. Lower concentrations would result in inadequate quantities of radioactive material being leached into the coolant effluent in event of a cladding breach to permit detection by the gamma monitoring system. Larger quantities could have a detrimental effect upon the fabrication of the lithium-aluminate targets.

The method of the invention operates in the following manner: 0.01 to 2.0 w/o of a rare earth isotope indicator as the oxide is added to each lithium-aluminate target core. The cores are then clad without bonding in aluminum and two aluminum-clad cores are clad without bonding in Zircaloy-2 to make up the target elements. A target element is inserted into a uranium driver element to make up a driver-target assembly and a number of such assemblies are inserted into each process tube in the production reactor. After a period of neutron irradiation, the rare earth isotope indicators become activated and become gamma radiation emitters.

In the event of failure of the Zircaloy-2 cladding on one of the target elements, the inner aluminum cladding is exposed to the coolant flowing through the process tube and corrodes, exposing the ceramic lithium-aluminate core to the flowing coolant. The core material leaches in the flowing coolant at a rate of 0.3 to 0.5 gm./hr. under reactor operating conditions, releasing particulate matter and the gamma-emitting active indicator material into the coolant flow. The gamma-radiation monitors detect the increase in gamma radiation in the coolant in the particular process tube and alert the reactor operators to such an increase. The reactor can then immediately be shut down and the driver-target assemblies including the defective element removed from the process tube.

It can readily be seen that the present invention provides an effective solution to the problem of defective target element detection and thus can prevent potential environmental radiation and loss-of-product problems in the future.

It will be understood that the invention is not to be limited to the details given herein but that it may be modified within the scope of the appended claims.

The embodiments of the invention in which an exclusive property or privilege is claimed are defined as follows:

1. A method for determining the presence of a defective lithium-aluminate target element in a liquid-cooled nuclear reactor containing a plurality of such elements comprising adding a rare earth isotope indicator to the lithium-aluminate in the elements, the indicator being an isotope activatable by neutron radiation to emit gamma radiation, whereby irradiating the elements containing the indicator in a reactor activates the indicator in the elements and the failure of a target element results in release of the activated indicator into the reactor coolant, monitoring the reactor coolant to detect the presence of gamma radiation therein and relating the presence of gamma radiation in the coolant to the failure of a lithium-aluminate target element.

2. The method of claim 1 wherein the lithium-aluminate target contains from 0.1 to 2.0 w/o of a rare earth isotope indicator.

3. The method of claim 2 wherein the lithium-aluminate target contains 0.3 to 0.8 w/o of a rare earth isotope indicator.

4. The method of claim 3 wherein the rare earth isotope indicator is an oxide and a member of the group consisting of Ce$^{140}$, Ce$^{142}$, Pr$^{141}$, Sm$^{152}$, Gd$^{158}$, Dy$^{164}$ and Lu$^{175}$.

References Cited

UNITED STATES PATENTS 3,509,759   5/1970   Sinclair et al. _____ 176—19 R

REUBEN EPSTEIN, Primary Examiner